United States Patent
Seong et al.

(10) Patent No.: US 9,419,252 B2
(45) Date of Patent: Aug. 16, 2016

(54) RECHARGEABLE BATTERY

(75) Inventors: Jae-Il Seong, Yongin-si (KR); Hideaki Yoshio, Yongin-si (KR); Kyung-Keun Lee, Yongin-si (KR); Jin-Wook Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 923 days.

(21) Appl. No.: 13/340,042

(22) Filed: Dec. 29, 2011

(65) Prior Publication Data

US 2013/0029208 A1     Jan. 31, 2013

Related U.S. Application Data (60) Provisional application No. 61/512,764, filed on Jul. 28, 2011.

(51) Int. Cl.
*H01M 2/02* (2006.01)

(52) U.S. Cl.
CPC .......... *H01M 2/0207* (2013.01); *H01M 2/0217* (2013.01)

(58) Field of Classification Search
None
See application file for complete search history.

(56) References Cited

U.S. PATENT DOCUMENTS

| | | |
|---|---|---|
| 8,043,742 B2 | 10/2011 | Yeo |
| 8,440,347 B2 | 5/2013 | Kwak et al. |
| 8,691,426 B2 | 4/2014 | Cha |
| 2009/0305128 A1 | 12/2009 | Yeo |
| 2010/0248015 A1* | 9/2010 | Cha .................... H01M 2/0202 429/176 |
| 2011/0045340 A1 | 2/2011 | Kwak |

FOREIGN PATENT DOCUMENTS

| | | |
|---|---|---|
| CN | 101604761 A | 12/2009 |
| CN | 101714644 A | 5/2010 |
| CN | 101847738 A | 9/2010 |
| CN | 102074730 A | 5/2011 |
| EP | 2133933 A1 | 12/2009 |
| EP | 2237341 A1 | 10/2010 |
| JP | 2001-135282 A | 5/2001 |
| JP | 2010-040181 A | 2/2010 |

(Continued)

OTHER PUBLICATIONS

European search report dated Nov. 27, 2012 issued by European Patent Office for the corresponding European patent application 12151834.4.

(Continued)

*Primary Examiner* — Patrick Ryan
*Assistant Examiner* — Wyatt McConnell
(74) *Attorney, Agent, or Firm* — Robert E. Bushnell, Esq.

(57) ABSTRACT

A rechargeable battery case that prevents a short circuit of a cell by inducing bending of a case under a lateral/longitudinal compression condition in a specific manner. The rechargeable battery case includes an opening in the case through which an electrode assembly is inserted. A bottom portion is provided at an end of the case opposite to that of the opening. A front portion is connected to the bottom portion. A back portion is connected to the bottom portion and the front portion. A joint portion is arranged between the front, back and bottom portion. Further, a first area and a second area are disposed longitudinally in the front and back portions. The second area is on either side of the first area. The joint portion in the second area is thicker than the joint portion in the first area.

19 Claims, 10 Drawing Sheets

(56) References Cited

FOREIGN PATENT DOCUMENTS

| | | |
|---|---|---|
| KR | 2003-0043407 A | 6/2003 |
| KR | 1020040074415 A | 8/2004 |
| KR | 2009-0127704 A | 12/2009 |

OTHER PUBLICATIONS

Chinese Office Action issued by the State Intellectual Property Office (SIPO) on Aug. 4, 2015 for the corresponding to Chinese patent application No. 2012102624072.

* cited by examiner

RECHARGEABLE BATTERY

CLAIM OF PRIORITY

This application claims priority to and the benefit of Provisional Application No. 61/512,764, filed on 28 Jul. 2011, in the United States Patent and Trademark Office, the entire content of which is incorporated herein by reference.

BACKGROUND OF THE INVENTION

1. Field of the Invention

The present invention generally relates to a rechargeable battery for inducing bending of a case under a compression condition.

2. Description of the Related Art

A rechargeable battery can repeatedly perform charge and discharge, unlike a primary battery, and includes, for example, a nickel-hydrogen battery, a lithium battery, and a lithium ion battery, and is manufactured in a pack form to be widely used in a portable electronic device such as a mobile phone, a laptop computer, and a camcorder. The rechargeable battery includes an electrode assembly that is spiral-wound in a jelly roll form by stacking a positive electrode and a negative electrode with a separator interposed therebetween, a case that houses the electrode assembly together with an electrolyte solution, and a cap assembly that seals an upper opening of the case For example, the case may be formed to be a cylinder or a square made of aluminum or an aluminum alloy. When the case is compressed and the shape is changed by a pressure applied in a direction perpendicular to a top-down direction of the squared case, that is, in the longitudinal compression condition, the case is bent or folded in a random direction so it is difficult to control a short circuit mode of the cell. In this instance, a positive electrode and a negative electrode can be short circuited inside an electrode assembly so the rechargeable battery may burn or explode.

The above information disclosed in this Related Art Section is only for enhancement of understanding of the background of the invention and therefore it may contain information that does not form the prior art that is already known in this country to a person of ordinary skill in the art.

SUMMARY OF THE INVENTION

The present invention has been made in an effort to provide a rechargeable battery for preventing an internal short circuit of a cell by inducing bending of a case under a longitudinal compression condition.

The present invention has been made in another effort to provide a rechargeable battery for preventing burning and explosion under the longitudinal compression condition. An exemplary embodiment of the present invention provides for a case for a battery to house an electrode assembly that may include an opening in the case through which the electrode assembly is inserted. A bottom portion at an end of the case is provided opposite to that of the opening. A bottom portion is provided at an end of the case opposite to that of the opening. A front portion is connected to the bottom portion. A back portion is connected to the bottom portion and the front portion. A joint portion is arranged between the front, back and bottom portion. Further, a first area and a second area are disposed longitudinally in the front and back portions. The second area is on either side of the first area. The first area and the second area extend into said joint portion. The joint portion in the second area is thicker than the joint portion in the first area.

The case may provide for the first and second areas to have the same thickness except in the joint portion.

The case may be formed in a single integrated piece.

The thickness of the joint portion in the first area may gradually decrease from the point of contact with the joint portion in the second area to a center line of the front and back portions.

The joint portion of the first area may have less mechanical strength than the joint portion of the second area.

The first area may be symmetrically disposed about a centerline of the front and back portions.

The joint portion in second area may have greater mechanical strength than the joint portion in the first area with respect to a compression force applied to the case.

A compression force exerted on the case may cause bending in the first area.

At a point of contact between the front portion and the bottom portion, a first curvature radius of the first area in the joint portion may be less than a second curvature radius of the second area in the joint portion.

The first curvature radius and the second curvature radius are internal curvature radii of curved portions in the first and second areas in the joint portion.

At a point of contact between the front portion and the bottom portion, a thickness of the first curvature radius of the first area in the joint portion and the second curvature radius of said second area in the joint portion may gradually reduce between the bottom portion and the front portion.

At a point of contact between the back portion and the bottom portion a thickness of a first curvature radius may gradually reduce between the bottom portion and the back portion.

The joint portion in the second area may have greater mechanical strength than the joint portion in the first area proportional to a cross-sectional difference in thickness between the joint portion of the first and second areas.

Upon a compression force being exerted on the case, the front side is bent in one direction and the back side is bent in a direction opposite to that of the front side.

The case may further include a cap assembly covering the open end of the case.

The electrode assembly may further include a negative electrode, a positive electrode, and a separator between the negative electrode and the positive electrode.

An electrode terminal installed in the cap assembly that may be electrically connected to the negative electrode.

The cap assembly may further include: a cap plate fixed to the opening of the case, said electrode terminal including an insulating gasket inserted into a terminal hole of the cap plate; a terminal plate electrically connected to the electrode terminal; an insulating plate provided between the cap plate and the terminal plate; and an insulating case provided between the electrode assembly and the cap assembly.

The insulating gasket electrically insulates the electrode terminal and the cap plate and may seal a gap between the electrode terminal and the cap plate.

The insulating plate electrically insulates the terminal plate and the cap plate and may seal a gap between the electrode terminal and the cap plate.

Therefore, an internal short circuit of the cell is prevented and the cell is prevented from being burned and exploded under the longitudinal compression condition.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Figure 1:
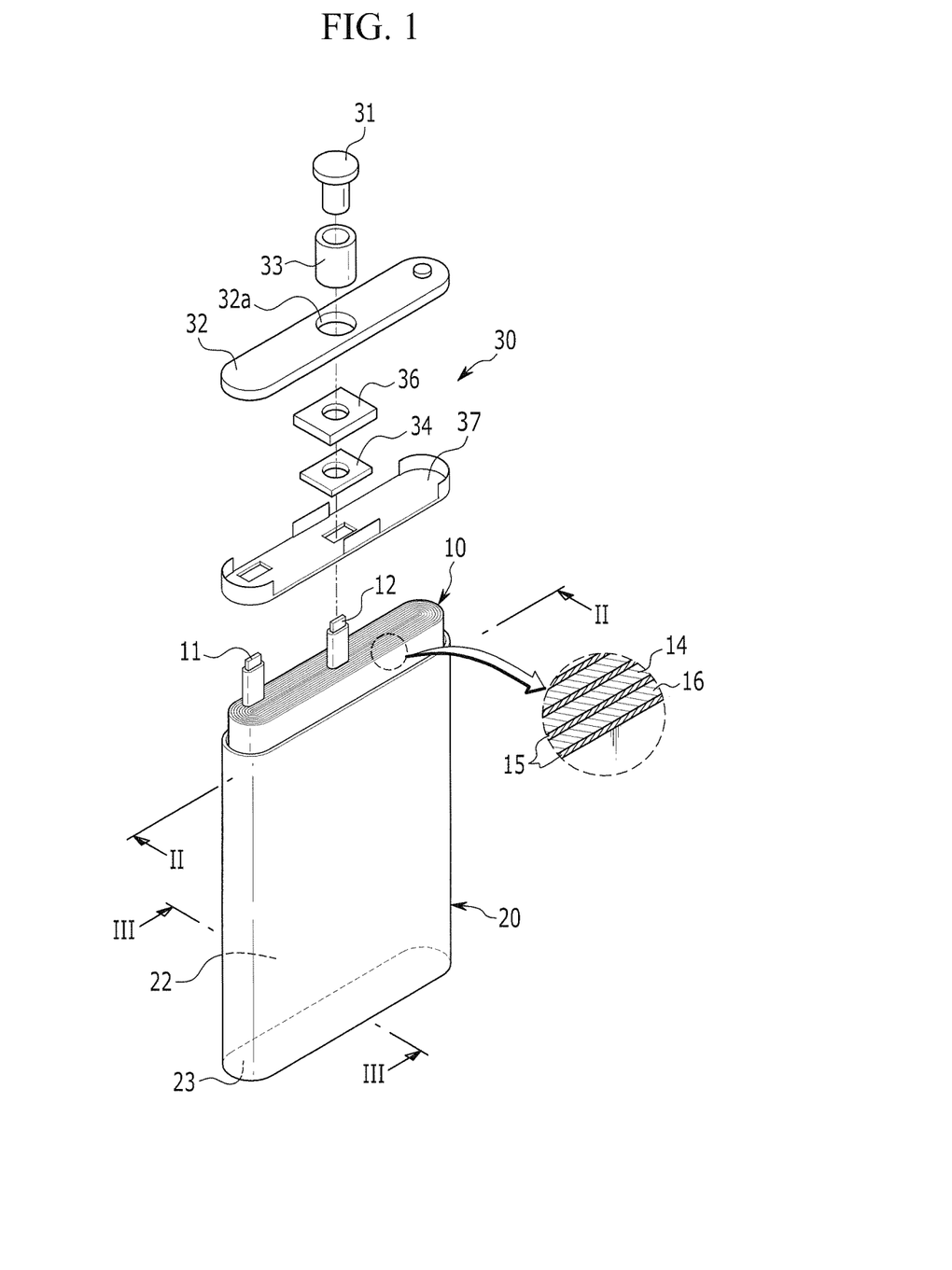
FIG. 1 shows an exploded perspective view of a rechargeable battery according to a first exemplary embodiment of the present invention.
Figure 2:
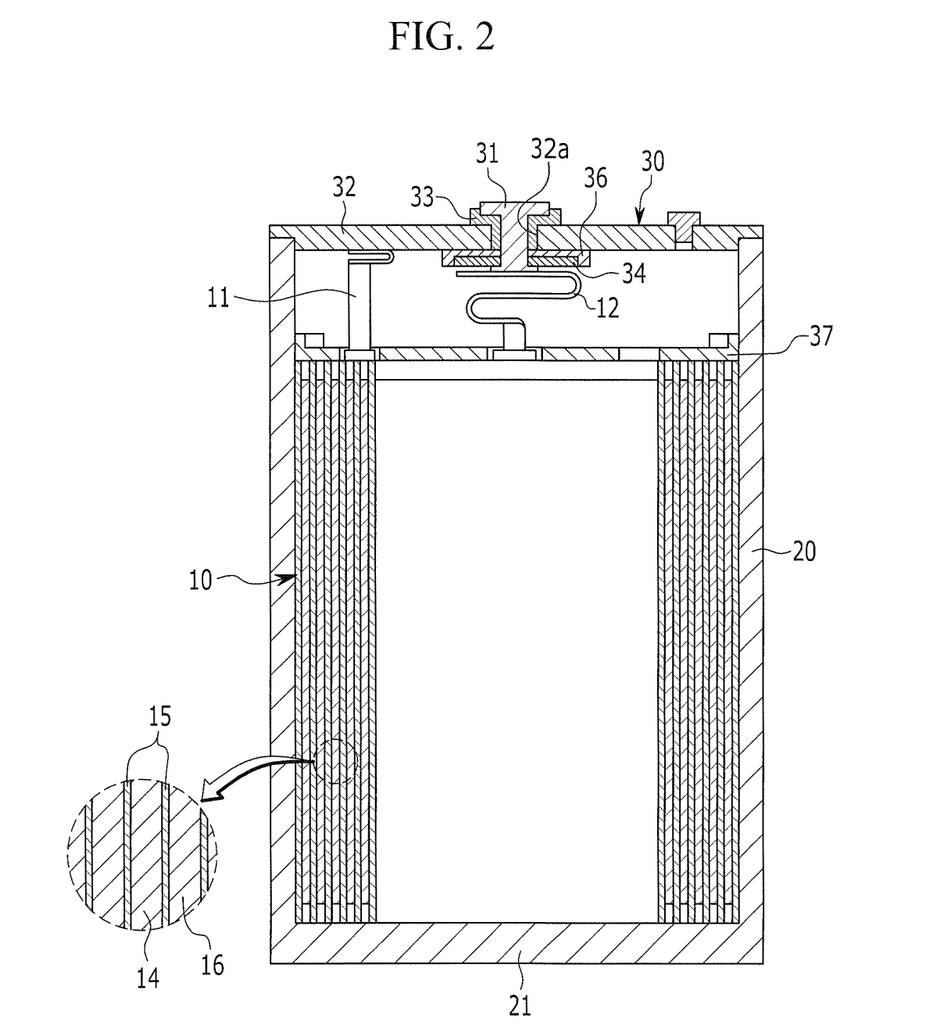
FIG. 2 shows a cross-sectional view with respect to a line II-II when a rechargeable battery of FIG. 1 is assembled.

FIG. 1 shows an exploded perspective view of a rechargeable battery according to a first exemplary embodiment of the present invention, and FIG. 2 shows a cross-sectional view with respect to a line II-II when a rechargeable battery of FIG. 1 is assembled.

Referring to FIG. 1 and FIG. 2, the rechargeable battery may include an electrode assembly 10 for charging and discharging a current, a case 20 for receiving the electrode assembly 10 together with an electrolyte solution, and a cap assembly 30 for sealing an upper opening of the case 20.

The electrode assembly 10 may be formed by stacking a positive electrode 14 and a negative electrode 16 and spiral-winding the same in a jelly-roll form with a separator 15, which is an electrical insulator, therebetween. The electrode assembly 10 has a form that corresponds to an inner space of the case 20 so that it may be inserted into the case 20.

The case 20 may receive the electrode assembly 10 through an opening formed on one side, and is formed as a conductor so that it may function as an electrode terminal. For example, the case 20 may be made of aluminum or aluminum alloys, and may be electrically connected to the positive electrode 14 of the electrode assembly 10 to work as a positive electrode terminal.

In this instance, an electrode terminal 31 installed in the cap assembly 30 may be electrically connected to the negative electrode 16 of the electrode assembly 10 to function as a negative electrode terminal. However, the case 20 may work as a negative electrode terminal and the electrode terminal 31 may function as a positive electrode terminal.

The cap assembly 30 may include a cap plate 32 fixed to the opening of the case 20. The electrode terminal 31 may include an insulating gasket 33 inserted into a terminal hole 32a of the cap plate 32, a terminal plate 34 electrically connected to the electrode terminal 31, an insulating plate 36 provided between the cap plate 32 and the terminal plate 34, and an insulating case 37 provided between the electrode assembly 10 and the cap assembly 30.

The insulating gasket 33 electrically insulates the electrode terminal 31 and the cap plate 32 and seals a gap between them. The insulating plate 36 electrically insulates the terminal plate 34 and the cap plate 32 and seals a gap between them. The insulating case 37 electrically insulates the electrode assembly 10 and the cap assembly 30.

A positive electrode lead 11 fixed to the positive electrode 14 of the electrode assembly 10 may be welded inside the cap plate 32 to transmit the current of the positive electrode 14 to the cap plate 32 and the case 20. That is, the case 20 functions as a positive electrode terminal. That is, the insulating case 37 insulates the negative electrode 16 of the electrode assembly 10 and the cap plate 32 with positive polarity.

A negative electrode lead 12 fixed to the negative electrode 16 of the electrode assembly 10 may be welded on the bottom of the terminal plate 34 to transmit the current of the negative electrode 16 to the terminal plate 34 and the electrode terminal 31. That is, the electrode terminal 31 functions as a negative electrode terminal.

Figure 3:
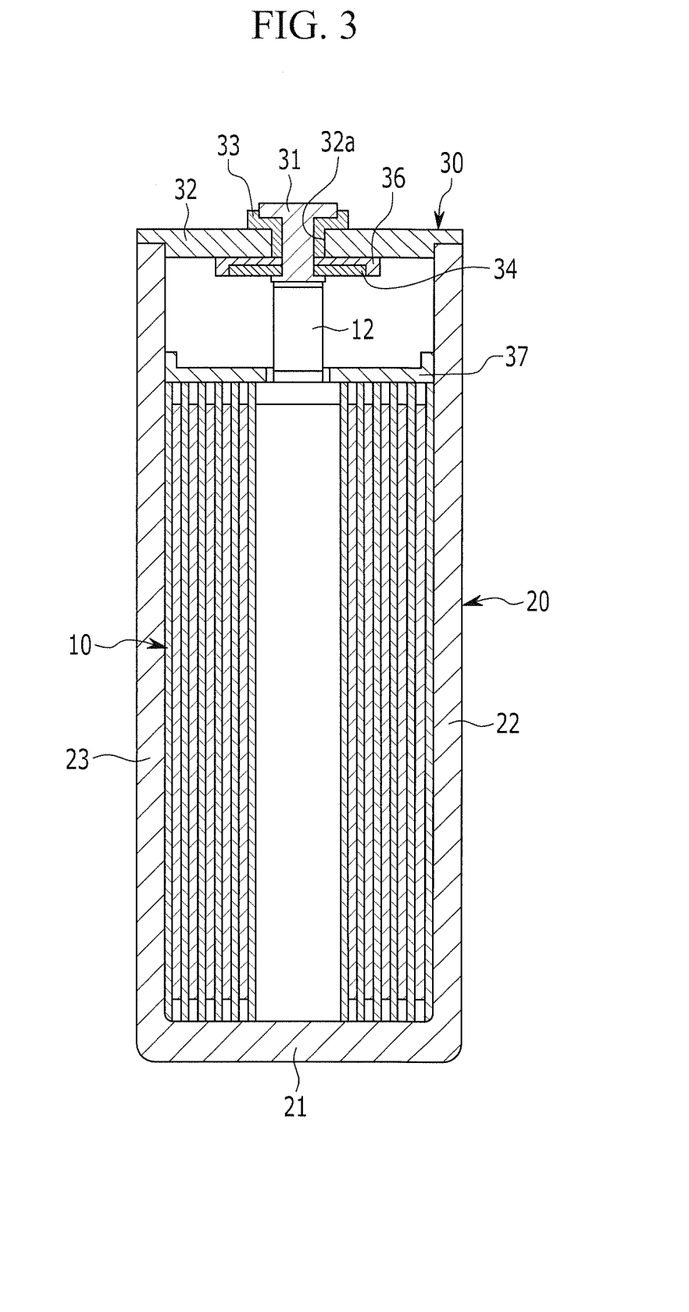
FIG. 3 shows a cross-sectional view with respect to a line III-III when a rechargeable battery of FIG. 1 is assembled.
Figure 4:
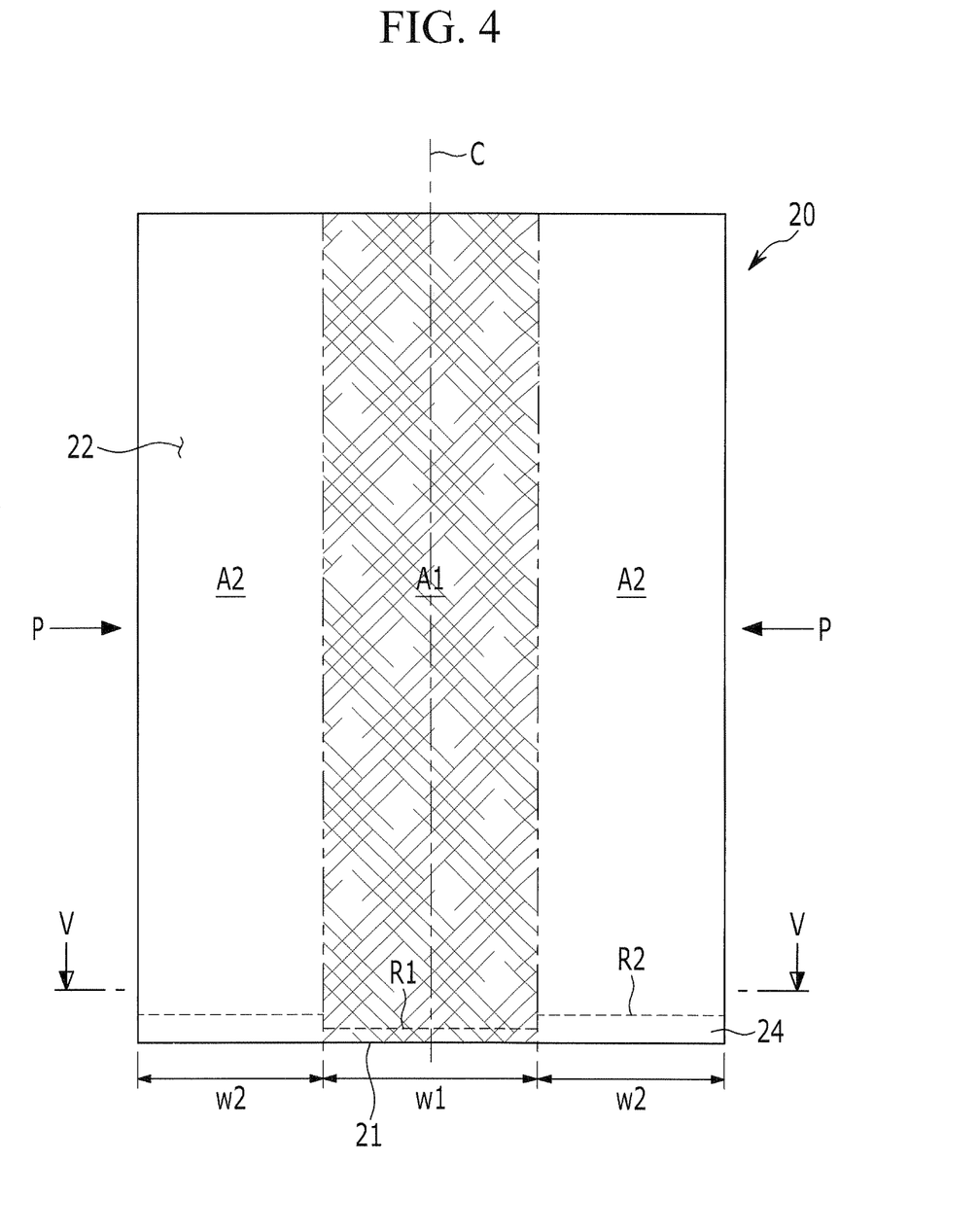
FIG. 4 shows a side view of a case applicable to a rechargeable battery of FIG. 1.

FIG. 3 shows a cross-sectional view with respect to a line when a rechargeable battery of FIG. 1 is assembled, and FIG. 4 shows a side view of a case 20 that is applicable to a rechargeable battery of FIG. 1.

Referring to FIG. 3 and FIG. 4, the case 20 has an opening on one side to form a space for receiving the electrode assembly 10, and it is formed to be a square including a first surface/wall 21 (hereinafter, a bottom portion) on the opposite side of the opening, a second surface/wall (hereinafter, a front portion) 22 surrounding the opening and one side of the bottom surface/wall 21, and a third surface/wall (hereinafter, a back portion) 23 surrounding another side.

The case 20 according to the first exemplary embodiment is formed to prevent damage to the electrode assembly 10 caused by lateral or longitudinal compression forces applied to the case 20. In FIG. 4, the lateral/longitudinal compression represents that the case 20 is compressed and transformed by pressure applied in the direction perpendicular to the top-down direction in the squared/rectangular case 20 (refer to FIG. 9). That is, in FIG. 4, the lateral/longitudinal compression direction (P) of the longitudinal compression condition is applied in the right and left sides of the case 20.

As an example, the case 20 is formed by deep drawing or pressing, and it is formed by connecting the bottom surface 21 and the front portion 22 with a curved surface and connecting the bottom portion 21 and the back portion 23 with a curved portion. A joint portion 24, discussed in detail in reference to FIG. 5, is arranged between the front, back and bottom portions (22, 23 and 21).

The case 20 is formed to induce the bent or folded position of the case 20 to a predetermined point in order to prevent the internal short circuit of the electrode assembly 10 under a lateral/longitudinal compression condition.

Figure 5:
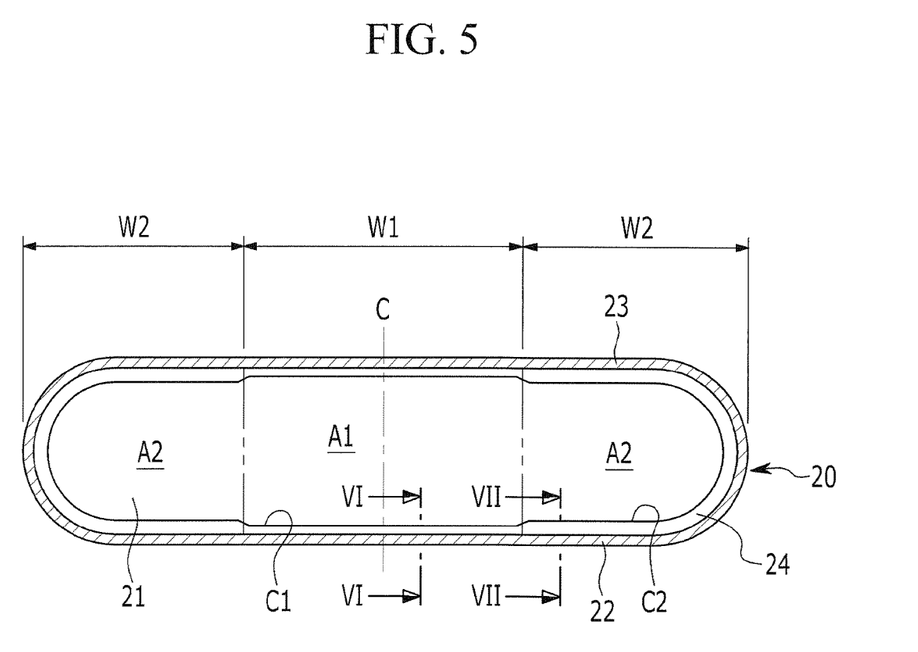
FIG. 5 shows a cross-sectional view with respect to a line V-V of FIG. 4.

FIG. 5 shows a cross-sectional view with respect to a line V-V of FIG. 4 illustrating in part the joint portion 24. Referring to FIG. 4 and FIG. 5, the case 20 is set to have different mechanical strengths for the longitudinal compression condition. That is, the case 20 includes a first area A1 with less mechanical strength for the longitudinal compression condition and a second area A2 with relatively greater mechanical strength than the first area A1. In FIG. 4, the first area A1 and the second area A2 have the same uniform thickness throughout with the exception of the joint portion 24, illustrated in FIG. 5, along line V-V of FIG. 4.

Referring to FIG. 5, the first area A1 of the joint portion 24 has a first width W1 with respect to the center line (C) of the case 20. The second area A2 has second widths W2 and W2 set on both sides of the first area A1. That is, the first area A1 or the first and second areas A1 and A2 are symmetric with respect to the center line (C) in the case 20.

As an example, the case 20 sets curvatures of the curved surfaces that connect the bottom portion 21 and the front portion 22 and also the bottom portion 21 and the back portion 23 according to the first and second areas A1 and A2, and differently sets a thickness of the curved surface according to the first and second areas A1 and A2. In general, the curvature of a a surface is the inverse of the radius in which the large the radius the smaller the curvature and the smaller the radius the larger the curvature.

The curvature of the curved surface connecting the bottom portion 21 and the front portion 22 and the curvature of the curved portion connecting the bottom portion 21 and the back portion 23 are the same so the curvature radius and comparison of thickness will be described by exemplifying the curved surface that connects the bottom portion 21 and the front portion 22. That is, the curved surface connecting the bottom portion 21 and the back portion 23 will not be described.

Figure 6:
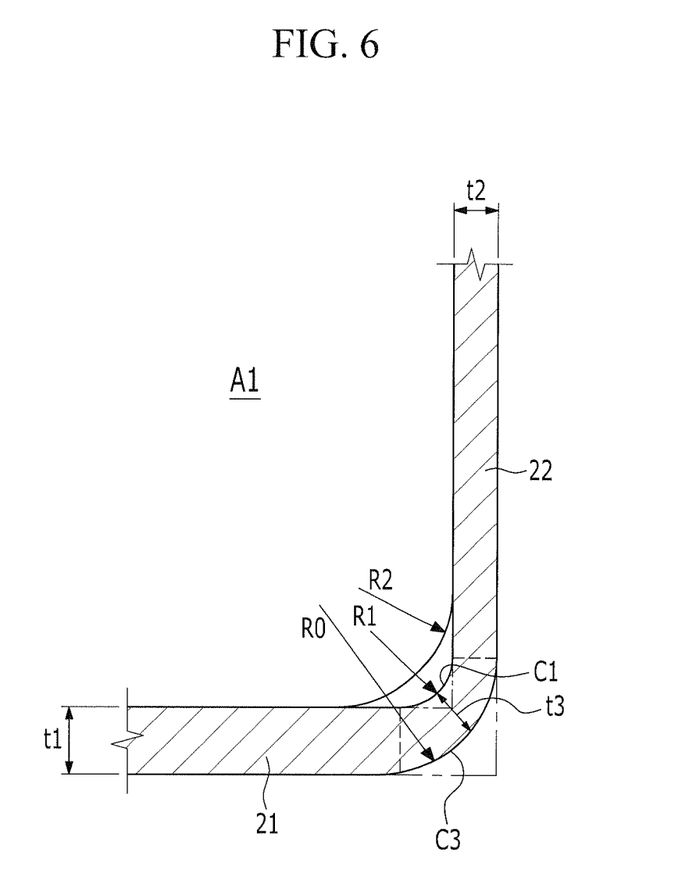
FIG. 6 shows a cross-sectional view with respect to a line VI-VI of FIG. 5.
Figure 7:
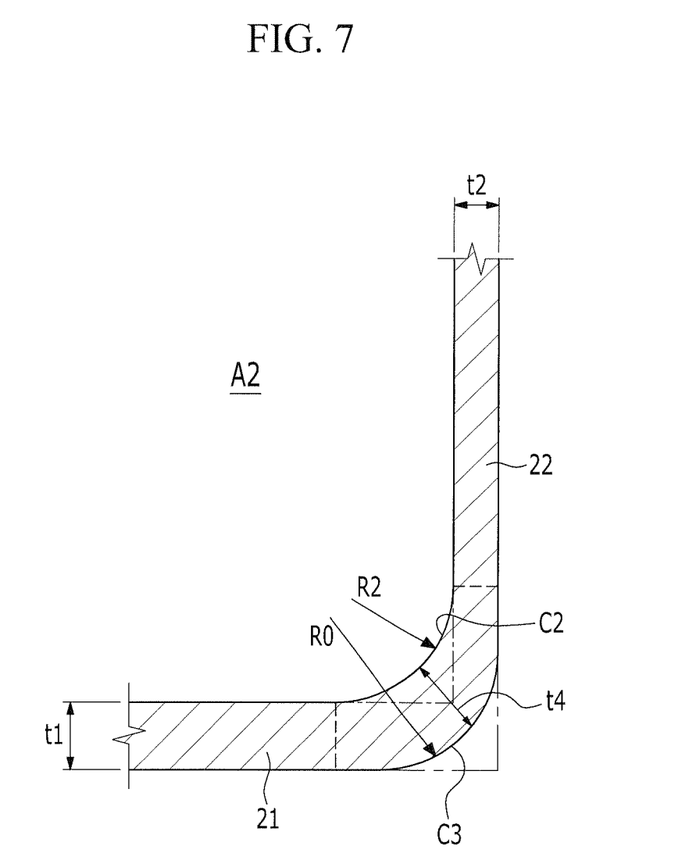
FIG. 7 shows a cross-sectional view with respect to a line VII-VII of FIG. 5.

FIG. 6 shows a cross-sectional view with respect to a line VI-VI of FIG. 5, and FIG. 7 shows a cross-sectional view with respect to a line VII-VII of FIG. 5. Referring to FIG. 6 and FIG. 7, regarding the case 20, a first thickness t1 of the bottom portion 21 is formed to be greater than a second thickness t2 of the front portion 22 (i.e., t1>t2) (where the thickness of the back portion 23 is the same as the thickness of the front portion 22.)

Therefore, the case 20 having mechanical strength may induce bending depending on the mechanical strength of the front portion 22 and the back portion 23 without being influenced by the mechanical strength of the bottom portion 21 under the lateral/longitudinal compression condition. That is, the case 20 may induce bending in the first area A1 that is weak compared to the second area A2. For example, the first thickness t1 of the bottom portion 21 is 0.4 mm and the second thickness t2 of the front portion 22 is 0.25 mm.

Referring to FIG. 4 to FIG. 6 and FIG. 7, the curved surface C1 connecting the bottom portion 21 and the front portion 22 in the first area A1 has a first curvature radius R1, and the curved surface C2 connecting the bottom portion 21 and the front portion 22 in the second area A2 has a second curvature radius R2. The first curvature radius R1 of the first area A1 is set to be less than the second curvature radius R2 of the second area A2.

For example, when the case 20 is pressed and formed, the first and second areas A1 and A2 are pressed with the second curvature radius R2 by using a punch with the relatively great second curvature radius R2, and the first area A1 is pressed with the first curvature radius R1 by additionally using a punch having the small first curvature radius R1.

The first and second curvature radii R1 and R2 represent internal curvature radii of the curved surfaces C1 and C2 in the first and second areas A1 and A2. The external curvature radius R0 of the curved surface C3 connecting the bottom portion 21 and the front portion 22 is the same in the first and second areas A1 and A2.

Therefore, the curved surfaces C1 and C2 connecting the bottom portion 21 and the front portion 22 form a third thickness t3 with the first curvature radius R1 in the first area A1, and form a fourth thickness t4 with the second curvature radius R2 in the second area A2.

The third and fourth thicknesses t3 and t4 are set to be between the first thickness t1 and the second thickness t2, and are gradually reduced toward the front portion 22 from the bottom portion 21. In FIG. 6 and FIG. 7, the third and fourth thicknesses t3 and t4 are shown at random positions in the curved surfaces C1 and C2.

Figure 8:
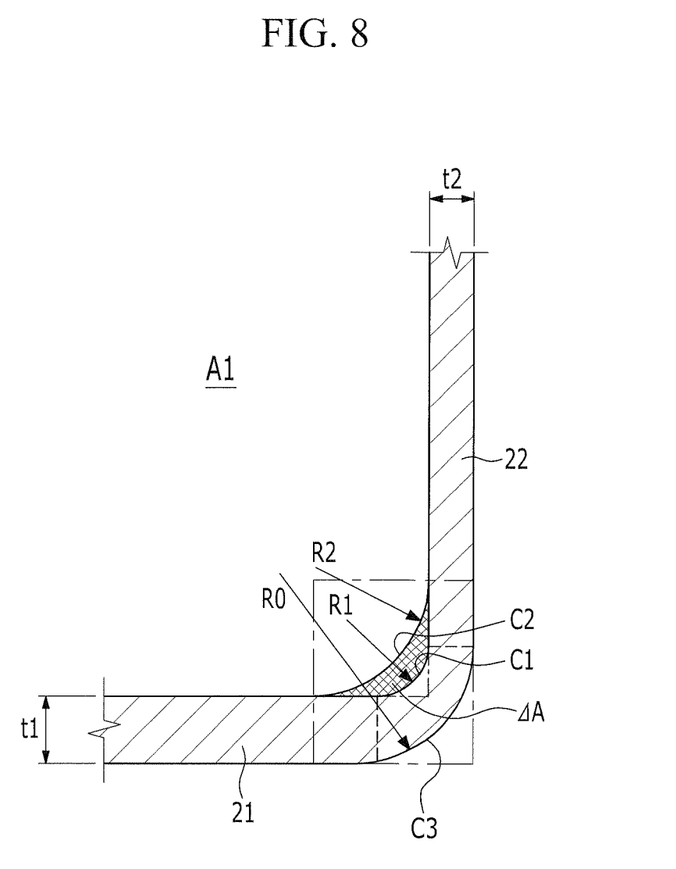
FIG. 8 shows a cross-sectional view for comparing a cross-section difference according to a curvature difference of FIG. 6 and FIG. 7.

FIG. 8 shows a cross-sectional view for comparing a cross-section difference according to a curvature difference of FIG. 6 and FIG. 7. Referring to FIG. 8, the curved surfaces C1 and C2 connecting the bottom portion 21 and the front portion 22 have a cross-section difference ($\Delta A$) in the first and second areas A1 and A2.

That is, the second area A2 has greater mechanical strength than the first area A1 by the cross-section difference ($\Delta A$). Therefore, bending can be induced in the first area A1 that is set with respect to the center line (C) of the case 20 under the longitudinal compression condition.

The second area A2 is provided on both sides with respect to the center line (C) of the case 20, and the first area A1 is partially provided between the second areas A2 so it is strong against cell swelling.

The first and second areas A1 and A2 are formed with the same configuration in the front portion 22 and the back portion 23, so when they are bent with the front portion 22 of the case 20 as the inside and the back portion 23 as the outside or they are bent with the back portion 23 as the inside and the front portion 22 as the outside, they are bent in the same manner and the internal short circuit is prevented.

Figure 9:
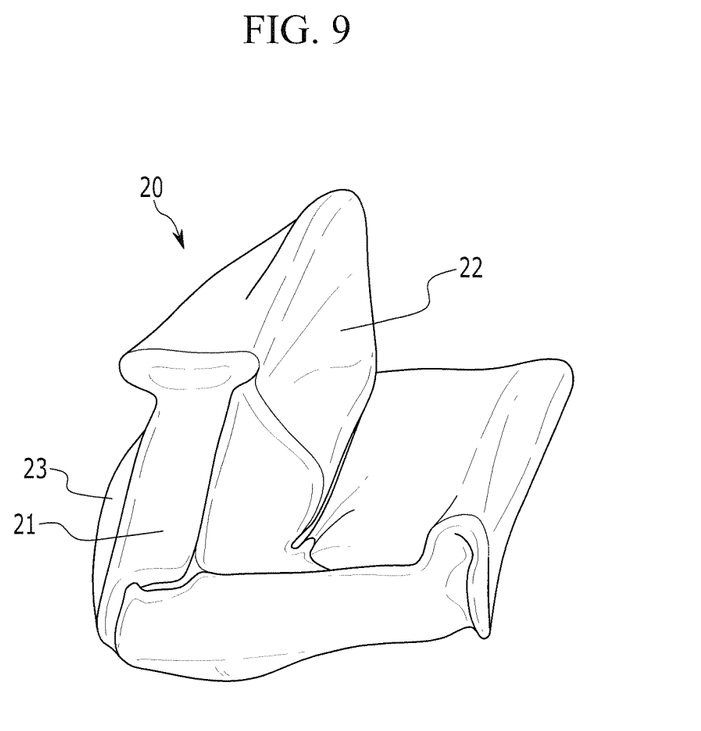
FIG. 9 shows a perspective view of a rechargeable battery in a longitudinal compression condition according to a first exemplary embodiment of the present invention.

FIG. 9 shows a perspective view of a rechargeable battery in a longitudinal compression condition according to a first exemplary embodiment of the present invention. Referring to FIG. 9, the rechargeable battery is bent while the front portion 22 is set as the inside in the first area A1 of the case 20 and the back portion 23 as the outside. In this instance, the internal short circuit can be prevented in the rechargeable battery.

Figure 10:
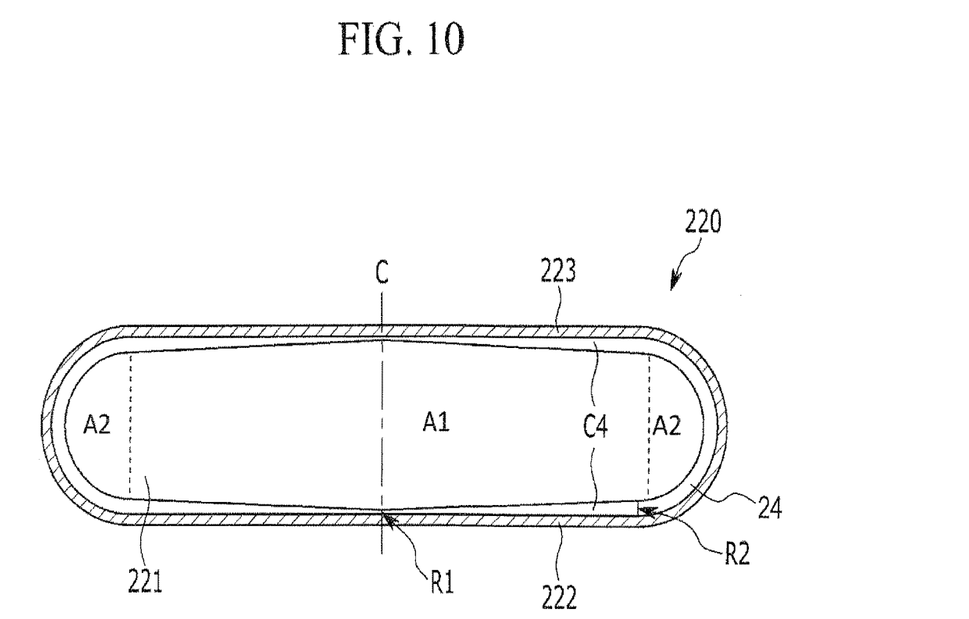
FIG. 10 shows a cross-sectional view of a joint portion for a case for showing a curvature difference of a case in a rechargeable battery according to a second exemplary embodiment of the present invention.

FIG. 10 shows a cross-sectional view of a case for showing a curvature difference of a case 20 and a joint portion 24 in a rechargeable battery according to a second exemplary embodiment of the present invention. In the description of the second exemplary embodiment, the same configuration as the first exemplary embodiment will be omitted.

In the first exemplary embodiment, the joint portion 24 of case 20 has the first area A1 with the first curvature radius R1 in the center in the width direction and has the second area A2 with the second curvature radius R2 on both sides of the first area A1.

However, a joint portion 24 of case 220, according to the second exemplary embodiment, has the first curvature radius R1, the minimum curvature, in correspondence to the center line (C), and has the second curvature radius R2, the maximum curvature, on both sides. The curvature radius is linearly reduced toward the center line (C) from the both sides of the case 220 (i.e., it is gradually reduced to the first curvature radius R1 from the second curvature radius R2).

That is, the cross-section difference (ΔA, refer to FIG. 8) that is set by the curved surface (C4) (including the curved surface connecting a bottom portion 221 and a back portion 223) connecting the bottom portion 221 and a front portion 222 is linearly reduced toward the center line (C) from both sides. A joint portion 24 is arranged between the front, back and bottom portions (222, 223 and 221).

Therefore, due to the structure of the joint portion 24 shown in FIG. 10, the case 220 has the weakest mechanical strength at the center line (C) so it efficiently prevents the internal short circuit of the cell since it is bent or folded near the center line (C) under the longitudinal compression condition.

The case 20 according to the first exemplary embodiment can be bent at somewhat different positions depending on the conditions within the range of the first area A1 under the longitudinal compression condition, and the case 220 according to the second exemplary embodiment sets the bending position more accurately since it is bent at the center line (C) under the longitudinal compression condition.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A case having an obround cross-sectional shape with two semicircular ends connected to parallel straight sides at endpoints of each semicircular end for a battery to house an electrode assembly, comprising:
   an opening in the case through which the electrode assembly is inserted;
   a bottom portion at an end of the case opposite to that of the opening;
   a front portion corresponding to one of the parallel straight sides and partial segments of both semicircular ends connected to the bottom portion;
   a back portion corresponding to another one of the parallel straight sides and partial segments of both semicircular ends connected to the bottom portion and the front portion;
   a joint portion arranged on an interior surface of the obround cross-sectional shaped case along the front and back portions; and
   a first area and a second area disposed longitudinally in the front and back portions, said second area on either side of the first area, said first area extending along the front and back portion on opposite sides of a center line of the front and back portions and said second area extending from the first, area entirely around each semicircular end of the case,
   wherein the joint portion in the second area is thicker than the joint portion in the first area, a distance between opposite sides of the joint portion in the first area is greater a distance between opposite skies of the joint portion in the second area, and the first area is wider than the second area.

2. The case recited in claim 1, wherein the case is a single integrated piece.

3. The case recited in claim 1, wherein the thickness of the joint portion in the first area gradually decreases from the point of contact with the joint portion in the second area to a center line of the front and back portions.

4. The case recited in claim 1, wherein the joint portion of the first area has less mechanical strength than the joint portion of the second area.

5. The case recited in claim 1, wherein the first area is symmetrically disposed about a centerline of the front and back portions.

6. The case recited in claim 1, wherein the joint portion in second area has greater mechanical strength than the joint portion in the first area with respect to a compression force applied to the case.

7. The case recited in claim 1, wherein a compression force exerted on the case causes bending in the first area.

8. The case recited in claim 1, wherein a first curvature radius of the first area in the joint portion is less than a second curvature radius of the second area in the joint portion.

9. The case recited in claim 8, wherein the first curvature radius and the second curvature radius are internal curvature radii of curved portions in the first and second areas in the joint portion.

10. The case recited in claim 9, wherein a thickness of the joint portion at a location of the first curvature radius of the first area and a location of the second curvature radius of said second area in the joint portion gradually reduces between the bottom portion and the front portion.

11. The case recited in claim 1, wherein from a point of contact between the back portion and the bottom portion a thickness of the joint portion at a location of a first curvature radius gradually reduces between the bottom portion and the back portion.

12. The case recited in claim 1, wherein the joint portion in the second area has greater mechanical strength than the joint portion in the first area.

13. The case recited in claim 1, wherein upon a compression force exerted on the case, the front side is bent in one direction and the back side is hem in a direction opposite to that of the front side.

14. The case recited in claim 1, further comprising:
   a cap assembly covering the open end of the case.

15. The case recited in claim 14, wherein the electrode assembly further comprises:
   a negative electrode;
   a positive electrode; and
   a separator between the negative electrode and the positive electrode.

16. The case recited in claim 15, further comprising:
   an electrode terminal installed in the cap assembly that is electrically connected to the negative electrode.

17. The case recited in claim 16, wherein the cap assembly, further comprises:

a cap plate fixed to the opening of the case, said electrode terminal including an insulating gasket inserted into a terminal hole of the cap plate;

a terminal plate electrically connected to the electrode terminal;

an insulating plate provided between the cap plate and the terminal plate; and an insulating case provided between the electrode assembly and the cap assembly.

18. The case recited in claim 17, wherein the insulating gasket electrically insulates the electrode terminal and the cap plate and seals a gap between the electrode terminal and the cap plate.

19. The case recited in claim 18, wherein the insulating plate electrically insulates the terminal plate and the cap plate and seals a gap between the electrode terminal and the cap plate.

* * * * *